United States Patent

[11] 3,527,136

| | | |
|---|---|---|
| [72] | Inventor | Charles A. Wilson<br>Williamstown, New Jersey |
| [21] | Appl. No. | 802,774 |
| [22] | Filed | Feb. 27, 1969 |
| [45] | Patented | Sept. 8, 1970 |
| [73] | Assignee | Standard Pressed Steel Co.<br>Jenkintown, Pennsylvania<br>a corporation of Pennsylvania |

[54] SELF-RETAINED THREAD ROLLING SCREW
13 Claims, 18 Drawing Figs.

[52] U.S. Cl. ..................... 85/46,
10/152, 151/22
[51] Int. Cl. ..................................... F16b 25/00,
F16b 39/30
[50] Field of Search..................................... 85/46, 48,
41, 47, 1P; 151/22; 10/152, 10

[56] References Cited
UNITED STATES PATENTS
| | | | |
|---|---|---|---|
| 2,096,937 | 10/1937 | McManus...................... | 85/47 |
| 3,156,152 | 11/1964 | Reed ........................... | 85/41 |
| 3,426,642 | 2/1969 | Phipard........................ | 151/22X |

FOREIGN PATENTS
| | | | |
|---|---|---|---|
| 210,236 | 7/1960 | Austria..................... | 85/46 |
| 943,575 | 12/1963 | Great Britain............ | 85/46 |

*Primary Examiner*—Ramon S. Britts
*Attorneys*—Stanley Belsky and Curtis, Morris and Safford ABSTRACT: A self-retaining thread rolling screw including a shank portion having a pilot end adapted to be received in an unthreaded hole in a metallic member. Spaced from the end of the pilot portion are a plurality of cam-shaped thread rolling members which initially align the screw within an unthreaded hole and, as the screw is rotated, roll form internal threads in the hole. Because of the shape of the thread rolling members, the internal threads are rolled by a radially outward elastic expansion of the metal, and, after the cam-shaped thread rolling members have passed through the rolled threads, there is a radially inward relaxation of the metal which provides a self-retention action on the screw after the cam-shaped rolling members have passed completely through the hole so that the screw cannot be inadvertently removed.

Patented Sept. 8, 1970 3,527,136
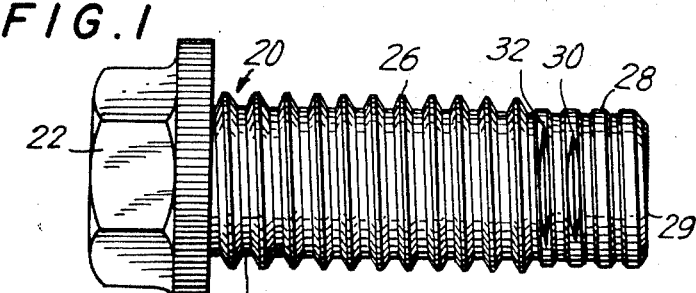
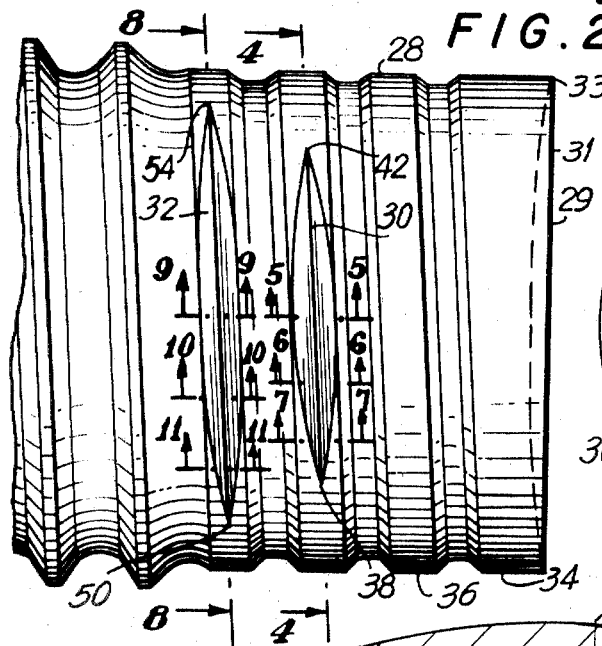
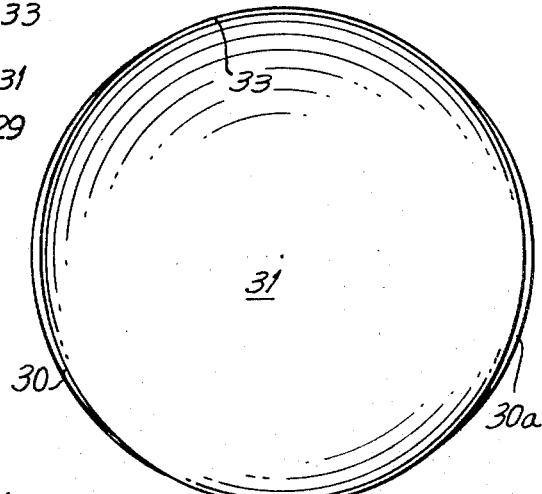
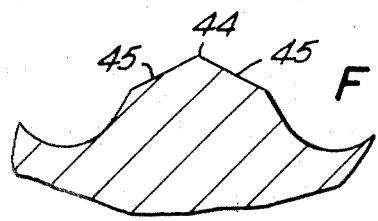
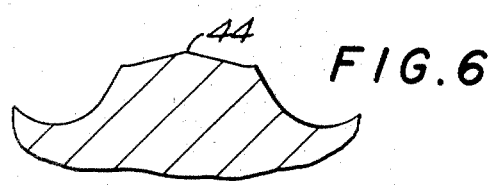
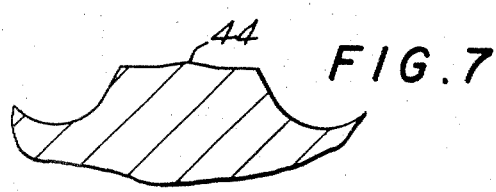
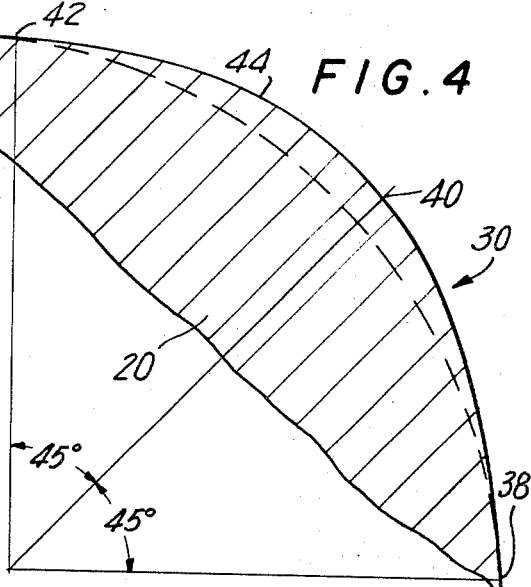
INVENTOR.
CHARLES A. WILSON
BY
ATTORNEYS

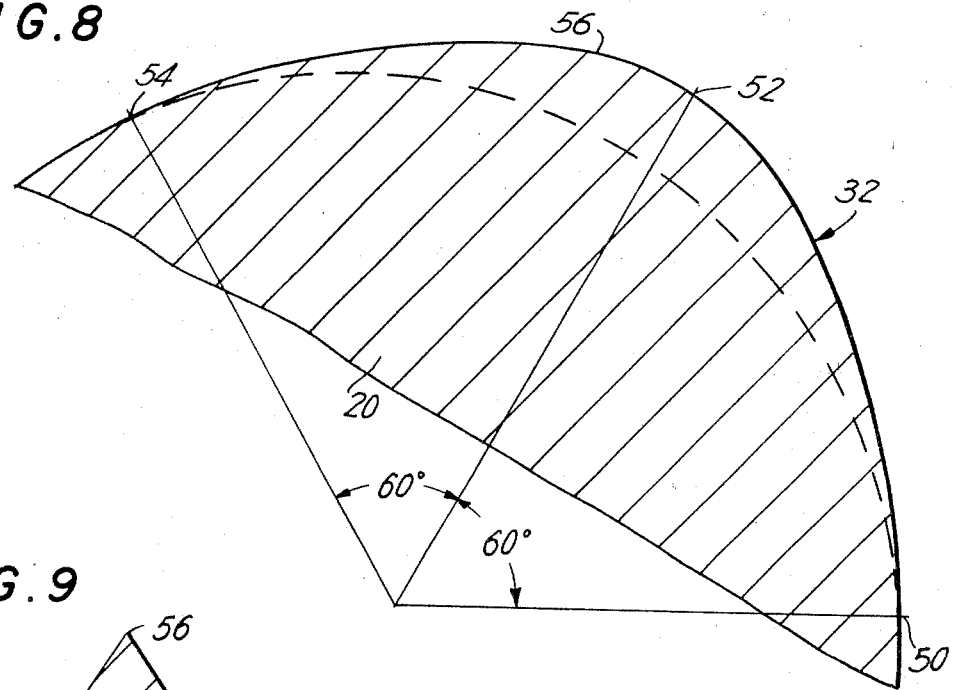
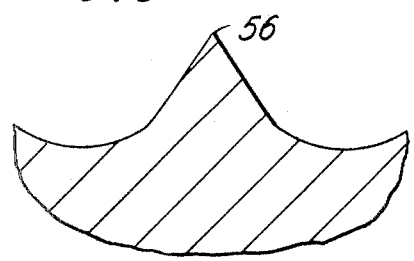
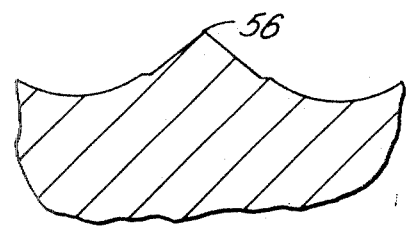
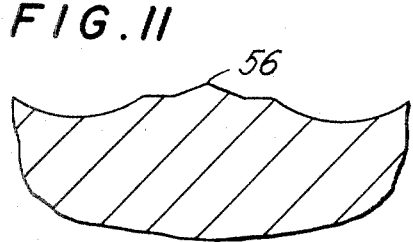
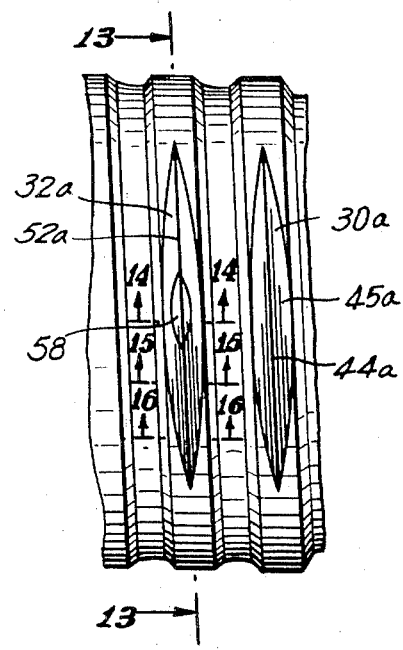
INVENTOR.
CHARLES A. WILSON Patented Sept. 8, 1970
3,527,136
Sheet 3 of 3
FIG. 13
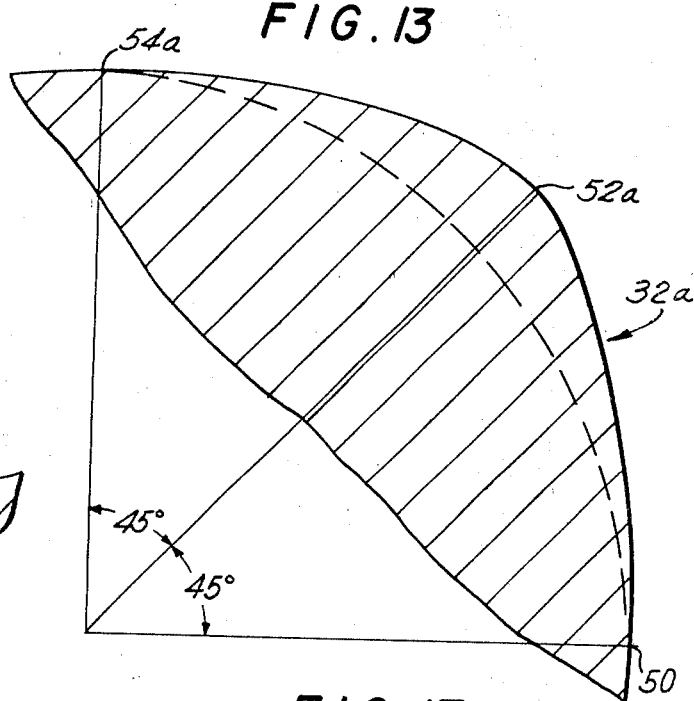
FIG. 14
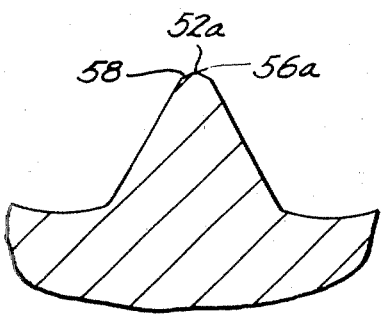
FIG. 15
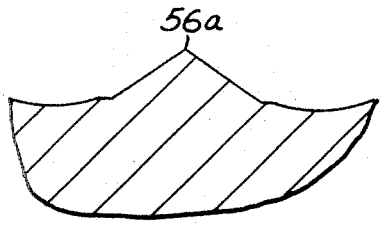
FIG. 16
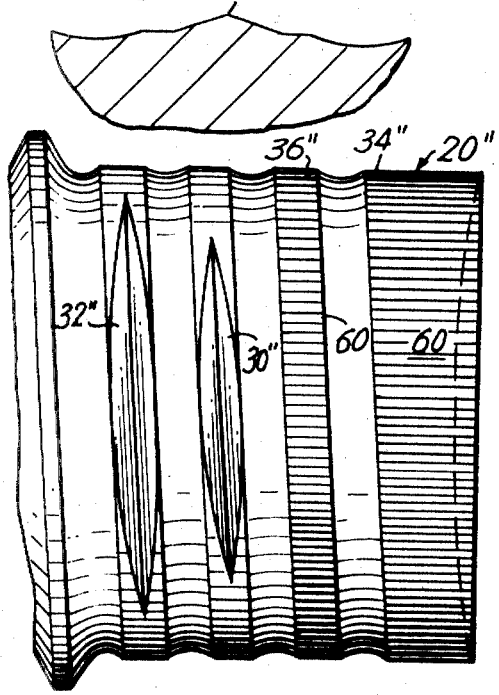
FIG. 17
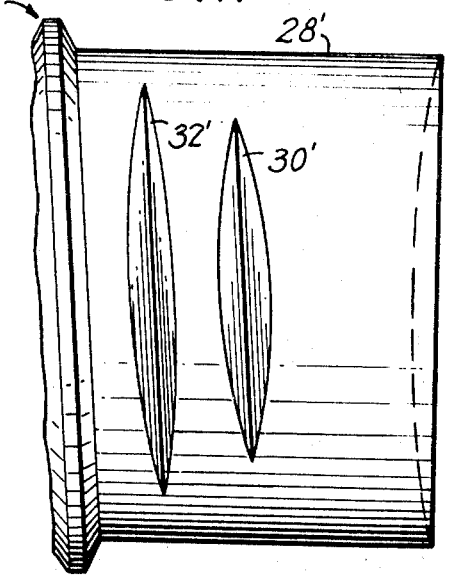
FIG. 18
INVENTOR.
CHARLES A. WILSON
BY
Curtis, Morris & Safford
ATTORNEYS 3,527,136

1

SELF-RETAINED THREAD ROLLING SCREW

This invention relates to screw threaded fastening devices and more in particular to screw threaded fastening devices which are adapted to roll form an internally threaded surface in a hole or bore.

Many devices have been proposed heretofore for forming an internally threaded surface in a bore or hole but these devices have not proven to be entirely satisfactory. Some of the more prevelant devices for forming internally threaded surfaces are the various tap sets, and the so-called self-tapping screws which are commonly made with various forms of tapered, entering or pilot ends to facilitate location and alignment of these screws.

Tap sets are cumbersome to use and require careful alignment of the entering tap, formation of the internally threaded surface by rotating the tap within the hole, removal of the tap and then assembly of the threaded screw fastener in the tapped hole. Necessarily this procedure requires considerable expenditure of valuable production time due to the elaborate procedures involved and, thus, threaded holes produced in this manner are exceedingly expensive, especially in high-speed production applications.

Self-tapping screws, while subject to installation in a more rapid manner, have had limited commercial use in precision applications due to the unreliability of the thread surface formed by this type of screw and also because the quality of the thread surface produced by these screws has been such as to preclude use in precision fastening applications. In addition, many of these self-tapping screws require an inordinately high installation torque and, hence, are difficult to install.

Accordingly, it is an object of the present invention to provide a unitary thread rolling screw which produces an internal roll formed thread of high quality.

It is a further object of this invention to provide a thread rolling screw which has an installation torque lower than existing thread forming devices.

It is a still further object of the present invention to provide a thread rolling screw which is self-aligning within a hole or bore thus facilitating its use as an internal thread rolling tool.

A still further object of the present invention is to provide a threaded screw fastener which can roll form its mating internal thread in a hole and which is self-retaining within the rolled internal thread surface after the screw has been installed.

Still another object of the present invention is to provide a thread rolling screw which provides a prevailing locking torque type thread to engage the main thread portion of the thread rolling screw.

In accordance with one embodiment of the present invention, a thread fastener element, such as a screw, is prepared with a pilot end adapted to enter an unthreaded bore or hole. Spaced from the end of the pilot end are a first pair of diametrically opposed cam-shaped protrusions which, as the threaded fastener member is rotated in a hole, engage the internal surface of the wall defining the hole and penetrate the wall surface to initiate the formation of the internally threaded surface. Spaced from this first pair of cam-shaped protrusions, at a spacing which is equal to the thread pitch of the threaded surface to be rolled, are a second pair of diametrically opposed cam-shaped protrusions which successively engage the scored indentation in the wall surface initiated by the first pair of cam-shaped protrusions and complete the radially outward expansion of the material as the fastener element is rotated in the hole thereby to roll form the internally threaded surface in the hole.

Further objects and advantages of the present invention will become apparent from the following description when considered in conjunction with the accompanying drawings wherein:

FIG. 1 is an elevational view of a roll form thread rolling screw prepared according to the present invention;

FIG. 2 is an enlarged elevational view of the thread forming end of the screw;

FIG. 3 is an end view of the thread rolling screw;

2

FIG. 4 is a partial sectional view taken on line 4—4 of FIG. 2 showing the first thread rolling surface;

FIGS. 5, 6 and 7 are partial sectional views taken on lines 5—5, 6—6, and 7—7 of FIG. 2, respectively;

FIG. 8 is a partial sectional view taken on line 8—8 of FIG. 2 showing another thread rolling surface;

FIGS. 9, 10 and 11 are partial sectional views taken on lines 9—9, 10—10 and 11—11 of FIG. 2, respectively;

FIG. 12 is a view similar to FIG. 2 showing the opposite side of the thread rolling screw;

FIG. 13 is a partial sectional view taken on line 13—13 of FIG. 12 showing another thread rolling surface;

FIGS. 14, 15 and 16 are partial sectional views taken on lines 14—14, 15—15 and 16—16 of FIG. 12, respectively;

FIG. 17 is a view similar to FIG. 2 showing an alternate embodiment; and

FIG. 18 is a view similar to FIGS. 2 and 17 showing another embodiment.

With reference to the drawings and particularly FIG. 1, there is shown a threaded fastener member such as a screw 20 having a shouldered hexagonal head 22, a shank portion 24 which is threaded as at 26 and a pilot end 20. While screw 20 is shown with a shouldered hexagonal head, it is to be understood that any other type driving head such as a socket head or the like may be used. Extending radially outward from the pilot end 28 and spaced from the end 29 of the shank 24 are cam-shaped protrusions 30 and 32 which are adapted to engage the wall of an unthreaded bore or hole (not shown) to roll form an internal thread surface therein.

While screw 20 is shown as being threaded along the whole extent of the shank 24, it is to be understood, that a screw may be provided with a partially unthreaded shank portion, i.e. a shoulder screw, where the unthreaded shank portion has a diameter equal to or greater than the major diameter of threads 26.

As seen more clearly in FIG. 2, the pilot portion 28 has two initial pilot threads 34 and 36 which are truncated and the screw 20 is selected for a particular hole size such that the diameter through truncated threads 34 and 36 is slightly undersized with respect to the hole in which the thread rolling screw fastener 20 is to be placed thereby to facilitate ready placement of the thread rolling fastener 20 in the bore or hole in which threads are to be formed. The undersized diameter of the pilot portion 28 allows for easy placement of the screw fastener 20 therein even at a canted angle with respect to the axis of the bore. Once the fastener member has been placed in an unthreaded bore, it is rotated therein causing the first cam-shaped protrusion 30 to engage the unthreaded wall surface of the bore.

The cam-shaped surface 30 is generally aligned along the lead of the threads to be rolled and rises from an initial bore engaging point 38, which is at the same diameter as the pilot threads 34 and 36, to a maximum protrusion at 40. The protrusion 30 is formed on an arc of the pilot end circumference generally along an included angle of from 70° to 150°. Illustratively, protrusion 30 is shown having a 90° included angle which rises in a 45° included angle of displacement from point 38 to a maximum extension at 40 and falls again during the next 45° included angle of displacement back to the same diameter as the pilot threads at 42.

The cam-shaped surface 30 comprises generally an eliptically-shaped protrusion in plan which inclines outwardly from a thickened base portion to converge and form a linearly disposed thread rolling surface 44. Surface 44 is adapted to contact and score the wall surface of the bore or hole in which the thread rolling screw 20 is rotated. While initial engagement between surface 44 and the wall of the bore is along a linear-point contact, as the screw 20 is progressively rotated so that cam-shaped protrusion 30 progressively engages the wall of the bore, the area of contact increases to include more of the inclined sides 45 of cam-shaped protrusion 30. With the increasing surface of engagement, more of the wall material is displaced.

As seen in FIGS. 4—7, the thread rolling surfaces 44 and 45, since they follow the rise and fall of the cam-shaped protrusion 30, progressively increase the extent of their protrusion from point 38 to a maximum protrusion at 40 and then decrease the extent of their protrusion back to the point 42.

While one such initial cam-shaped surface 30 is sufficient for purposes of initiating a roll formed thread in a bore or hole, it has been found that a second such surface 30a, diametrically opposite the first surface, is preferred. Thus, in the embodiment disclosed herein, as the screw 20 is rotated within an unthreaded hole, the first engagement with the hole will be by the cam-shaped surface 30 and, after the screw is rotated 180°, the second surface 30a, will similarly engage the hole and follow in the indentation initiated by the thread forming surfaces 44 and 45 on the first cam-shaped surface 30. The wall engaging surfaces 44, 44a, 45 and 45a elastically displace the wall material due to the gradual engagement of the thread rolling surfaces resulting from the rise and fall of the cam-shaped surfaces 30 and 30a. Thus, after an initial maximum displacement of the wall surface material initiated by the crest height of the cam-shaped protrusion, there is a partial elastic relaxation of the displaced material so that the final displacement is less than that of the maximum crest height.

The cam-shaped protrusions 30 and 30a assist in axially aligning the screw 20 so that it is co-axial with the hole in which it is placed. Since the initial surfaces of engagement 44 and 44a, form a substantially linear contact with the wall surface of the hole and the pilot portion 28 has a major diameter less than the diameter of the hole, the screw 20 can effectively pivot about the surfaces of contact 44 and 44a permitting the screw 20 to be axially aligned if it was initially placed in the hole in non-axial alignment. Additionally, the cam-shaped protrusions 30 and 30a initiate thread formation by scoring the wall surface and partially roll forming the thread surface by displacing material forming the wall of the hole.

As the screw is progressively engaged within the bore, the next cam-shaped protrusion 32, which is similarly oriented along the lead of the threads to be formed and spaced from cam-shaped protrusion 30 a distance equal to the pitch of the threads, engages the internal surface of the hole and follows along the scored indentation formed by protrusions 30 and 30a therein. As best seen in FIGS. 8—11, cam-shaped protrusion 32 rises from the pilot diameter at 50 to a maximum extension at 52 and back to the pilot diameter at 54 through an included angle of 120°. Thus, there is a 60° rise to the maximum protrusion and a 60° fall back to the pilot diameter. In like manner, a linear thread rolling surface 56 is formed at the crest of this cam-shaped surface and, this thread rolling surface 56 is similarly co-extensive with the lead and pitch of the threads to be rolled. The increased included angle of cam-shaped protrusion 32 permits a more gradual engagement with the wall surface to facilitate plastic deformation of the surface.

Another cam-shaped surface 32a (see FIG. 12) is also preferably provided diametrically opposite surface 32 and co-extensive with the lead and pitch of the threads rolled by cam-shaped surface 32. Cam-shaped surface 32a, similar to cam-shaped surfaces 30 and 30a, rises from the pilot diameter 50a to a maximum crest height at 52a and falls back to the pilot diameter at 54a in a 90° included angle of displacement and includes a thread rolling surface 56a (see FIGS. 14—16) which at the maximum crest height, is oversized with respect to the root depth of the internal threads being rolled. The maximum protrusion of the cam-shaped surface 52a, since it is slightly oversized with respect to the major diameter of the threads on the screw at 26, accommodates the elastic relaxation of the displaced wall material and provides an ultimately free-spinning engagement between the screw threads 26 and the rolled internal thread surface. This allows tightening of the screw to its full recommended tightening torque as there is no loss of tightening force due to friction between the screw thread surface and the internally threaded surface commonly associated with other thread forming screws. This is true since those prior art thread forming screws which utilize the threads on the main body of the screw to form the internally threaded surface have a consistent friction drag between the screw and the internally threaded mating member which can account for up to 50 percent of lost preload, when measured by torque.

As shown in FIG. 14, the crest 52a of cam-shaped protrusion 32a includes an additional inclined surface 58 which provides a slightly thickened bearing surface to ride in the scored indentation formed by the cam-shaped protrusions 30, 30a and 32. This slightly thickened bearing surface effects the final displacement of wall material to form the final thread root clearance so that the crest thickness of threads 26 on the shank of screw 20 fit freely therein.

Two pairs of diametrically opposed cam-shaped protrusions have been found to be effective for most thread rolling applications. However, it can be appreciated that the present invention may utilize more or less than the four protrusions described herein and that the protrusions need not be diametrically opposed to each other as long as they are co-extensive with the lead and pitch of the threads to be rolled. Hence, the present invention contemplates using a greater number of cam-shaped protrusions which may be randomly spaced about the shank of screw 20.

The end of shank 24 may also include a cupped indentation 31 which forms an annular thin edged cutting ridge 33 (see FIGS. 2 and 3) around the periphery of end 29. Cutting ridge 33 provides a metal punching surface so that the screw 20 may be used as a metal punch which can be forced into solid sheet material to punch a hole therein. Once the screw 20 has formed its own hole, the cam-shaped protrusions 30, 30a, 32 and 32a then roll form an internal thread surface in the same manner as described above. Hence, screw 20 can be used to form its own hole in a sheet material as well as an internally threaded surface therein.

FIGS. 17 and 18 show alternate configurations for the thread rolling end of the screw 20. As seen in FIG. 14, screw 20' has a pilot end 28' with the appropriate thread rolling protrusions 30' and 32' thereon to roll form the threads in the bore. The absence of the truncated pilot thread portion on the pilot end 28' provides a self-retention feature which makes it difficult to remove the screw 20' from the hole once it has been installed as the pilot diameter of end 28' is greater than the minimum diameter of the internally threaded surface formed.

In FIG. 18, there is shown still another embodiment 20'' having cam-shaped thread forming protrusions 30'' and 32'' thereon and including a knurled exterior facing 60 on truncated pilot thread portions 34'' and 36''. Screw 20'' having a pilot portion configuration as shown in FIG. 18 is used, for example, when forming an internally threaded surface in a hole having a painted wall surface. Thus, as the screw 20'' is rotated within the painted bore or hole, the knurled facing 60 removes the paint from the wall surface facilitating formation of the roll formed internally threaded surface. Alternatively, the screw 20'' may also be used to ream or size a previously drilled hole before rolling a threaded surface therein.

The thread forming screw 20 of the present invention forms an internally threaded surface by a camming action initiated by the rise and fall of the bearing surfaces on the respective cam-shaped protrusions 30, 30a, 32 and 32a. Because during the roll forming of the thread there is first a progressively increasing surface of engagement and then a progressively decreasing surface of engagement, the effect is to lessen the resistance to turning of the screw within the hole. This turning resistance or installation torque is appreciably less than the installation torque required to install prior art thread forming devices such as self-tapping screws and the like. Consequently, internal roll formed thread surfaces may be produced with appreciable greater ease and facility without requiring additional tooling.

Additionally, the first engaging cam-shaped surfaces 30 and 30a act as snagging cams which assist in advancing screw 20 in the hole without requiring application of a push force. Entry of the screw in a hole is merely a result of the rotative force placed on the screw.

The snagging cams 30 and 30a also act as initial aligning members which automatically accommodate for any initial misalignment of the screw 20 in the hole. Because progressive engagement of each of the thread forming surfaces is gradual due to the graduated rise in the cam-shaped protrusions, the metallic material of the wall of the bore is elastically displaced and, hence, roll formed to provide a smooth, burr-free thread configuration which is superior to thread configurations formed by cutting, for example by tap sets. Further, since the thread rolling operation is a result of a partially elastic deformation there is a partial relaxation of the deformed wall material after the last cam-shaped protrusion 32a has been rotated through the hole. Thus, once the thread forming end of screw 20 is through the hole, there is a resistance to turning the thread rolling end of screw 20 out of the thread hole. This resistance results in a self-retaining feature so that screw 20 cannot be inadvertently removed from the threaded hole. Hence, to remove the self-threading screw 20 from a hole in which it has been installed it is necessary to apply a torque which may be as high as 25 percent of the installation torque.

As an alternative to providing thread rolling surfaces which result in a free-spinning engagement between the threads 26 and the rolled internal threads, the extent of the protrusions of cam-shaped surfaces 30 and 32 can be selected to provide a controlled prevailing drag or torque between the threads 26 and the rolled internal threads. Thus, the extent of the protrusion of cam-shaped surfaces 30 and 32 determine the relationship between the screw threads 26 and the threaded surface roll formed by the thread rolling end. Hence, if the protrusions are selected to be just slightly oversized with respect to the major diameter of threads 26, then after the threads are rolled the elastic relaxation of the wall surface of the bore will be sufficient to provide a slight interference fit with threaded portion 26 and, hence, provide a drag or prevailing torque to resist inadvertent turning off forces usually associated with vibration effects.

I claim:
1. In an internal thread rolling screw:
   a shank portion having a continuous thread thereon and having a pilot end thereon adapted to fit in an unthreaded hole;
   a truncated thread on said pilot end defining a continuation of the thread on said shank but being of a lesser depth than said thread on said shank;
   a thread rolling protrusion extending from said truncated thread;
   said protrusion being generally eliptically-shaped in plan and integral with said truncated thread and extending outwardly from its base with inclined converging sides which converge along a linearly disposed crest;
   said inclined converging sides being angularly related to the flanks of said truncated thread and lying within the profile of said flanks;
   said linearly disposed crest being oriented along a path coincident with the lead of the threads to be rolled;
   said protrusion being disposed along an arc of said pilot end circumference and defined by a limited circumferential angle; and
   said protrusion rising in the degree of its extension from said pilot end from a minimum extent at one end to a maximum crest height to fall back to a minimum extent at its other end.

2. A thread rolling screw as defined in claim 1 including a plurality of truncated threads on said pilot end wherein at least one of said pilot threads includes a roughened exterior surface thereon to frictionally engage the wall surface of a bore in which threads are to be formed thereby to scrape said wall surface and remove a coating surface thereon.

3. A screw as defined in claim 1 including a plurality of protrusions on said pilot end, each said protrusion forming a hole engaging surface coincident with the lead of the threads to be rolled.

4. A screw as defined in claim 3 wherein said plurality of protrusions include two pairs of oppositely disposed protrusions with each said pair spaced from each other a distance at least equal to an integral multiple of the pitch of the threads to be rolled.

5. A screw as defined in claim 3 including a metal punching surface on the end of said shank portion whereby said punching surface is adapted to punch a hole in a sheet of metal material and roll form an internally threaded surface therein.

6. A thread rolling screw as defined in claim 3 wherein said plurality of cam-shaped protrusions are spaced about said pilot end with each said cam-shaped protrusion being co-extensive with the pitch of the threads to be rolled.

7. A thread rolling screw as defined in claim 3 wherein said protrusions extend outwardly from said shank along an arc of the shank circumference within an included angle in the range of 70° to 150°.

8. A thread rolling screw as defined in claim 3 wherein at least one of said protrusions has an included angle of approximately 90° and wherein said extension of said protrusion rises to a maximum extension in an included angle of approximately 45° and falls back from said maximum extension in an included angle of approximately 45°.

9. A thread rolling screw as defined in claim 3 wherein at least one of said protrusions has an included angle of approximately 120° and wherein said extension of said protrusion rises to a maximum extension in an included angle of approximately 60° and falls back from said maximum extension in an included angle of approximately 60°.

10. A thread rolling screw as defined in claim 9 wherein said one protrusion has a thread rolling surface along its mid portion thereof comprising in cross-section first convergingly inclined sides rising from said protrusion base portion and terminating before convergence and inclined sides continuous with said first side which converge along a line to define said linear crest.

11. A thread rolling screw as defined in claim 1 wherein said pilot end comprises a cylindrical hole engaging member having a diameter greater than the root diameter of the threaded portion of said screw thereby to preclude removal of said screw once said screw has been threaded in a hole.

12. A thread rolling screw as defined in claim 1 wherein said maximum extent of said protrusion is oversized with respect to the major diameter of the threads on said shank threaded portion thereby to roll an internally threaded surface which is free-spinning on said shank threaded portion.

13. A thread rolling screw as defined in claim 1 wherein said maximum extent of said protrusion is equal to or less than the major diameter on said shank threaded portion thereby to roll an internally threaded surface which has a controlled prevailing torque when said shank threaded portion is rotatably engaged therein.